US011897535B2

(12) United States Patent
Zhang

(10) Patent No.: US 11,897,535 B2
(45) Date of Patent: Feb. 13, 2024

(54) FOLDING HOOK STRUCTURE AND CARRIAGE FRAME AND AS WELL AS BABY CARRIAGE HAVING THE SAME

(71) Applicant: Wonderland Switzerland AG, Steinhausen (CH)

(72) Inventor: Xiaojian Zhang, Guangdong (CN)

(73) Assignee: Wonderland Switzerland AG, Steinhausen (CH)

(*) Notice: Subject to any disclaimer, the term of this patent is extended or adjusted under 35 U.S.C. 154(b) by 0 days.

(21) Appl. No.: 17/579,607

(22) Filed: Jan. 20, 2022

(65) Prior Publication Data
US 2022/0234639 A1 Jul. 28, 2022

(30) Foreign Application Priority Data
Jan. 22, 2021 (CN) .......................... 202110087652.3

(51) Int. Cl.
B62B 7/06 (2006.01)
(52) U.S. Cl.
CPC .................................... B62B 7/066 (2013.01)
(58) Field of Classification Search
CPC ...... B62B 7/066; B62B 7/064; B62B 2205/24; B62B 7/083; B62B 7/062; B62B 2205/20
See application file for complete search history.

(56) References Cited

U.S. PATENT DOCUMENTS

| 6,238,125 | B1 * | 5/2001 | Lin | ........................... | B62B 7/06 |
| | | | | | 403/102 |
| 8,985,616 | B1 * | 3/2015 | Chen | ....................... | B62B 7/062 |
| | | | | | 280/47.38 |
| 2008/0073879 | A1 * | 3/2008 | Chen | ......................... | B62B 7/08 |
| | | | | | 280/642 |
| 2009/0020984 | A1 * | 1/2009 | Chen | ....................... | B62B 7/123 |
| | | | | | 74/551.8 |

(Continued)

FOREIGN PATENT DOCUMENTS

CN 2710701 Y * 7/2005
CN 203047334 U 7/2013
(Continued)

OTHER PUBLICATIONS

Office action dated Nov. 22, 2022 for JP application No. 2022-004782, filing date: Jan. 17, 2022, pp. 1-4.

*Primary Examiner* — James A Shriver, II
*Assistant Examiner* — Ian Bryce Shelton
(74) *Attorney, Agent, or Firm* — Winston Hsu

(57) ABSTRACT

A folding hook structure comprising: a shell, fixed to the first object, and at least partially accommodates other parts of the folding hook structure; a rotating disk, fixed to the second object, and disposed in the shell to be rotatable around a rotation center in respect to the shell, with a folding hook groove disposed on a disk surface of the rotating disk, the folding hook groove including a circumferential section extending in a circumferential direction of the rotating disk with the rotation center as a center, and a radial section (Continued)

extending from the circumferential section along a radial direction of the rotating disk; a folding hook, disposed in the shell, and arranged movable between a locked position and a released position along the radial direction of the rotating disk, the folding hook being inserted in the folding hook groove.

14 Claims, 13 Drawing Sheets

(56) References Cited

U.S. PATENT DOCUMENTS

| | | | | |
|---|---|---|---|---|
| 2011/0248477 A1* | 10/2011 | Chen | ........................ | B62B 7/10 280/647 |
| 2012/0126512 A1* | 5/2012 | Kane | ........................ | B62B 7/08 280/647 |
| 2013/0076009 A1* | 3/2013 | Tsai | ........................ | B62B 7/064 280/647 |
| 2013/0156490 A1* | 6/2013 | Schroeder | ................. | B62B 7/08 403/104 |
| 2014/0056638 A1* | 2/2014 | Wu | .......................... | B62B 7/06 403/84 |
| 2014/0167393 A1* | 6/2014 | Tsai | ........................ | B62B 7/064 280/650 |
| 2015/0360709 A1* | 12/2015 | Pos | ........................... | B62B 7/06 280/47.38 |
| 2016/0340162 A1* | 11/2016 | Standard | ................... | B62B 5/00 |
| 2017/0297600 A1* | 10/2017 | Zhong | .................... | B62B 7/062 |
| 2017/0313337 A1* | 11/2017 | Horst | .................... | B62B 7/044 |
| 2018/0043917 A1* | 2/2018 | Plested | ................... | B62B 7/062 |
| 2018/0065655 A1* | 3/2018 | Leys | ...................... | B62B 7/064 |
| 2019/0322304 A1* | 10/2019 | Zhong | .................... | B62B 7/142 |
| 2021/0387659 A1* | 12/2021 | Zhang | .................... | B62B 7/064 |
| 2022/0169297 A1* | 6/2022 | Pujol | ..................... | B62B 7/062 |

FOREIGN PATENT DOCUMENTS

| | | | | |
|---|---|---|---|---|
| CN | 104590350 | | 5/2015 | |
| CN | 107031691 | | 8/2017 | |
| CN | 107472343 A | * | 12/2017 | ............. B62B 7/083 |
| CN | 108502004 A | * | 9/2018 | ............. B62B 7/06 |
| CN | 109808759 | | 5/2019 | |
| CN | 209321034 | | 8/2019 | |
| CN | 112224267 | | 1/2021 | |
| EP | 3626578 A1 | * | 3/2020 | |
| GB | 2505078 | | 2/2014 | |
| JP | 2016-133203 A | | 7/2016 | |
| JP | 2018008697 A | * | 1/2018 | ............. B62B 7/06 |
| WO | WO-2009132985 A1 | * | 11/2009 | ............. B62B 7/062 |

\* cited by examiner

FOLDING HOOK STRUCTURE AND CARRIAGE FRAME AND AS WELL AS BABY CARRIAGE HAVING THE SAME

BACKGROUND OF THE INVENTION

1. Field of the Invention

The present application relates to a foldable hook structure, and a carriage frame as well as a baby carriage including the folding hook structure.

2. Description of the Prior Art

The baby carriage is a carrier widely used in life. A baby carriage usually includes a carriage frame, wheels, a seat, and a handrail. Among them, the carriage frame forms a main frame of the baby carriage, the wheels are installed under the carriage frame to provide walking function, the seat is set up on the carriage frame for baby to sit in, and the handrail is located above the carriage frame for facilitating the user to push the baby carriage.

In some circumstances, in order to increase a portability of the baby carriage, the carriage frame needs to be collapsible. In such case, the carriage frame needs to be designed foldable, so as to reduce the overall volume of the baby carriage. Therefore, it is necessary to design the pivot joint and the folding hook structure for locking and releasing the pivot joint on the carriage frame, so as to open and collapse the carriage frame. Considering that the baby carriage is an infant product, accordingly, its pivot joint and folding hook structure should be safe, reliable and easy to operate.

SUMMARY OF THE INVENTION

According to one aspect of the application, a folding hook structure is provided for putting a first object and a second object being relatively rotatable in respect to each other to an extended state or a collapsed state, the folding hook structure includes: a shell, fixed to the first object, and at least partially accommodates other parts of the folding hook structure; a rotating disk, fixed to the second object, and disposed in the shell and being rotatable around a rotation center in respect to the shell, with a folding hook groove disposed on a disk surface of the rotating disk, the folding hook groove including a circumferential section extending in a circumferential direction of the rotating disk with the rotation center as a center, and a radial section extending from the circumferential section along a radial direction of the rotating disk; a folding hook, disposed in the shell, and arranged movable between a locked position and a released position along the radial direction of the rotating disk, the folding hook being inserted in the folding hook groove; wherein in the locked position, the folding hook is engaged in the radial section of the folding hook groove to prevent a relative rotation between the shell and the rotating disk; and in the released position, the folding hook is slidable along the circumferential section of the folding hook groove to allow the relative rotation between the shell and the rotating disk.

In an embodiment, a folding hook accommodation space extending along the radial direction of the rotating disk is disposed in the shell, the folding hook includes a slider portion and a convex portion on the slider portion, the slider portion is received in the folding hook accommodation space and slidable along the folding hook accommodation space, and the convex portion protrudes into the folding hook groove of the rotating disk.

In an embodiment, the radial section of the folding hook groove extends from an end of the circumferential section toward a direction away from the rotation center of the rotating disk, and a side wall of the radial section facing the circumferential section is inclined to form an oblique groove, such that the radial section has a larger width where near the circumferential section and a smaller width where away from the circumferential section.

In an embodiment, a folding hook elastic member is disposed between the folding hook and the shell, the folding hook elastic member has one end abutting against the shell and the other end biasing the folding hook to the locked position.

In an embodiment, the foldable hook structure further includes: a sliding member, at least partially arranged in the shell, and movable between an extended position close to the rotating disk and a retracted position away from the rotating disk along the radial direction of the rotating disk; wherein a notch is formed on an outer circumference of the rotating disk, and in the released position, the notch is able to be aligned with the sliding member as the rotating disk rotates; when the notch is not aligned with the sliding member, the sliding member abuts against the outer circumference of the rotating disk and unable to move to the extended position; when the notch is aligned with the sliding member, the sliding member is able to move to the extended position and engage into the notch, thereby locking a rotation angle of the rotating disk in respect to the shell.

In an embodiment, a recess is further disposed on the outer circumference of the rotating disk, and the recess is approximately located at a position opposite to a middle position of the circumferential section of the folding hook groove. In the locked position, the recess is aligned with the sliding member for the sliding member to abut against thereon, and a depth of the recess is designed such that the first object and the second object are rotatable in respect to each other under an action of an external force.

In an embodiment, the foldable hook structure further includes: a trigger member, passing through the shell along an axial direction of the rotating disk and including an operating section exposed outside the shell and a trigger section abutting against the sliding member inside the shell, the trigger member is operated movable in a direction perpendicular to the rotating disk, so as to bring the sliding member to move from the extended position to the retracted position.

In an embodiment, an end of the trigger section is provided with a trigger member operating surface, the sliding member is provided with a sliding member operating surface, and the trigger member operating surface and the sliding member operating surface are respectively correspondingly arranged inclined surfaces and capable of contacting each other, such that a movement of the trigger member in a direction perpendicular to the rotating disk is able to be converted into a movement of the sliding member along the radial direction of the rotating disk.

In an embodiment, the inclined surface of the trigger member operating surface is arranged to extend from a vicinity of a bottom wall of an outer shell of the shell toward an inner shell of the shell, and is closer to the rotating disk at the bottom wall of the outer shell, so as to form an inclination angle in respect to a rotation axis of the rotating disk; and the inclined surface of the sliding member operating surface and the inclined surface of the trigger member operating surface have a same inclination angle.

In an embodiment, a sliding member elastomer is disposed between the sliding member and the shell, and the sliding member elastomer is arranged to bias the sliding member to the extended position.

In an embodiment, the shell includes an outer shell and an inner shell, one of the outer shell and the inner shell includes a bottom wall and a side wall erected along an outer circumference of the bottom wall, and the other one of the outer shell and the inner shell is embedded in the side wall, so as to form a closed structure with the one of the outer shell and the inner shell. Moreover, the one of the outer shell and the inner shell is fixed to the first object, and the second object passes through a slot on the side wall to be joined to the rotating disk.

In an embodiment, the first object and the second object are both tubular parts, when the folding hook is in the locked position, the first object and the second object are in the collapsed state; and when the folding hook is in the released position, the first object and the second object are in the extended state.

According to the other one aspect of the application, a carriage frame is provided, and the carriage frame includes: an upper carriage frame, having an upper joint; a lower carriage frame having a lower joint; and the folding hook structure of the application connected between the upper joint and the lower joint, wherein the first object is the upper carriage frame, and the second object is the lower carriage frame.

According to a further one aspect of the application, a baby carriage is provided, and the baby carriage includes: a seat; wheels; and the carriage frame according to the application, the seat is fixed on the carriage frame, and each of the wheels is installed at an end of the lower carriage frame of the carriage frame close to the ground.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

Embodiments of the application will be described in detail below in conjunction with the accompanying drawings, in which.

DETAILED DESCRIPTION

The disclosure is illustrated and described herein with reference to specific embodiments, though, the disclosure should not be limited to the details shown. Rather, various modifications can be made to these details within the scope of the equivalents of the claims and without departing from the disclosure.

The descriptions of "front," "rear," "up," "down" and other directions mentioned in this specification are only for the convenience of understanding, and the disclosure is not limited to these directions, but can be adjusted according to actual conditions.

Figure 1A:
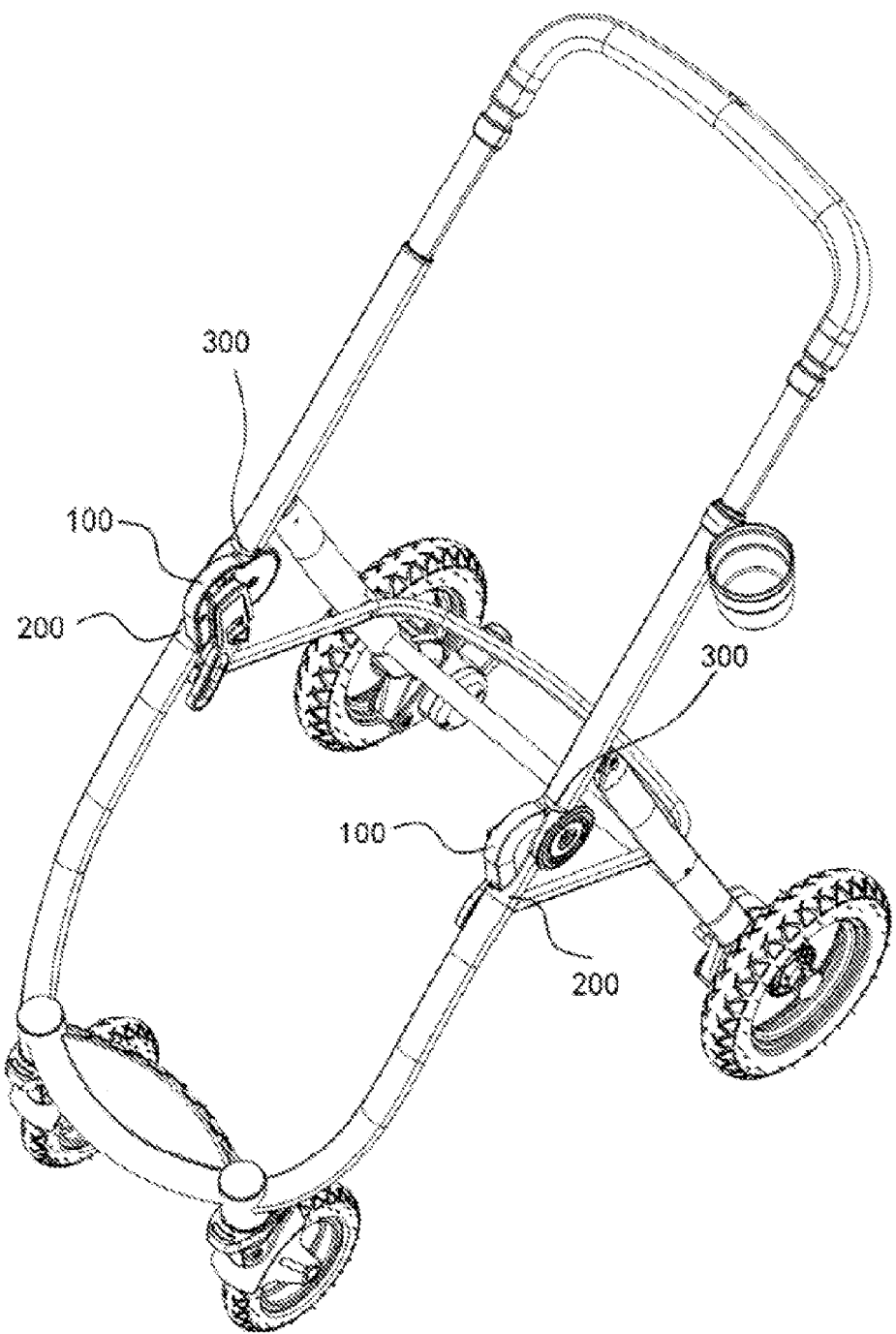
FIG. 1A is a perspective view of a carriage frame according to the application.
Figure 1B:
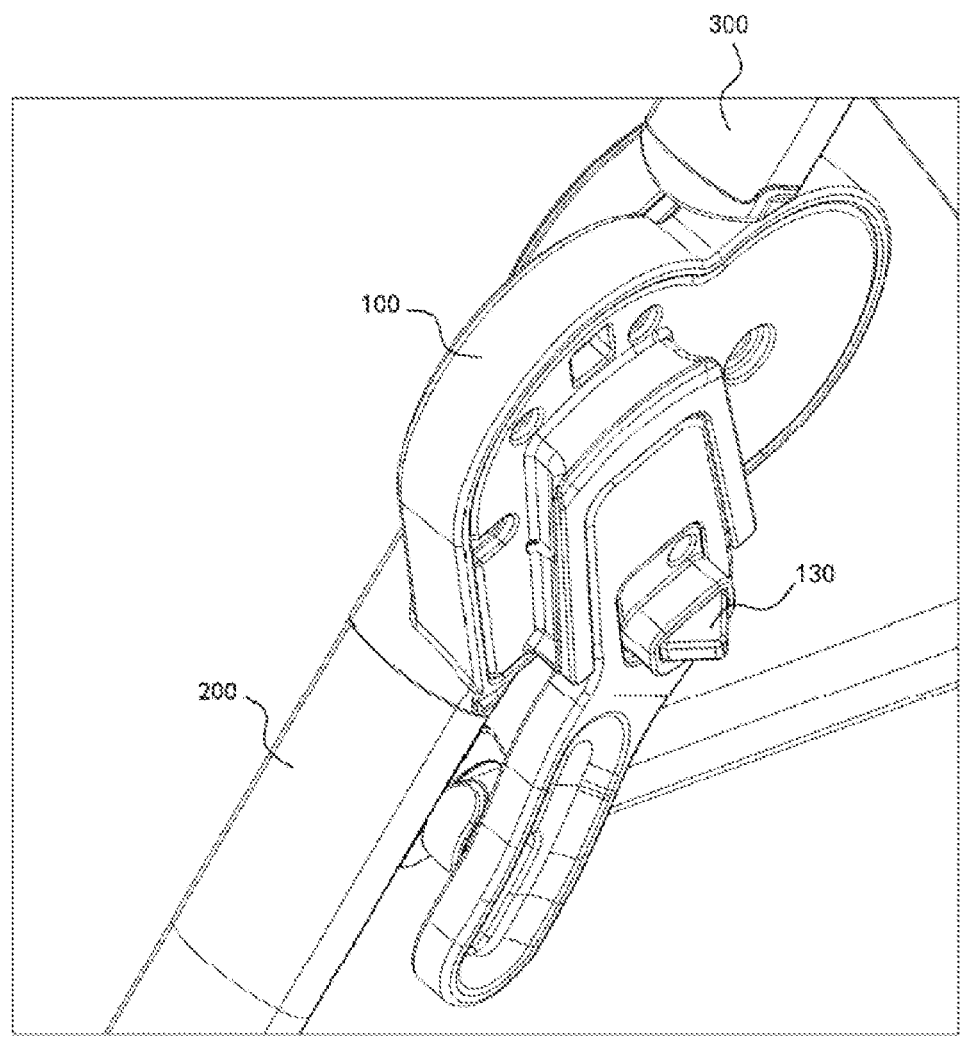
FIGS. 1B and 1C are partial enlarged views of FIG. 1A, showing specific structures of the folding hook structures on left and right sides, respectively.
Figure 1C:
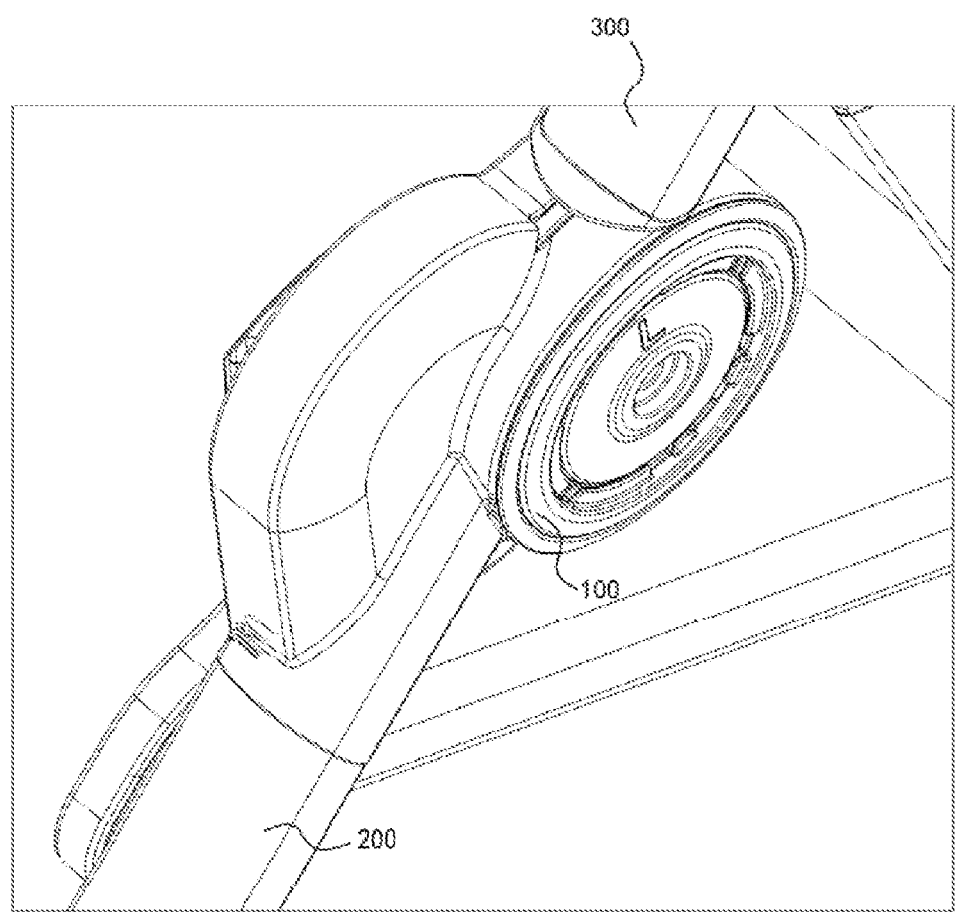
Figure 6A:
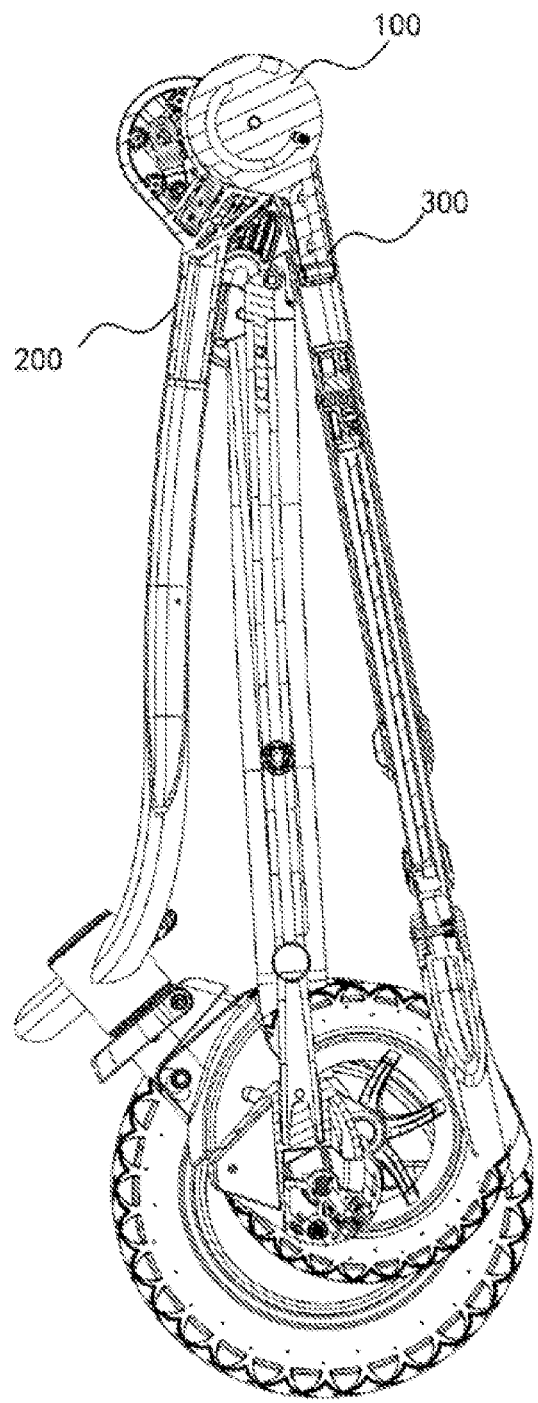
FIG. 6A is a side view of the carriage frame according to the application, in which internal details of the folding hook structure is shown in the form of a sectional view of the folding hook structure on one side, and the folding hook is in a locked position.
Figure 6B:
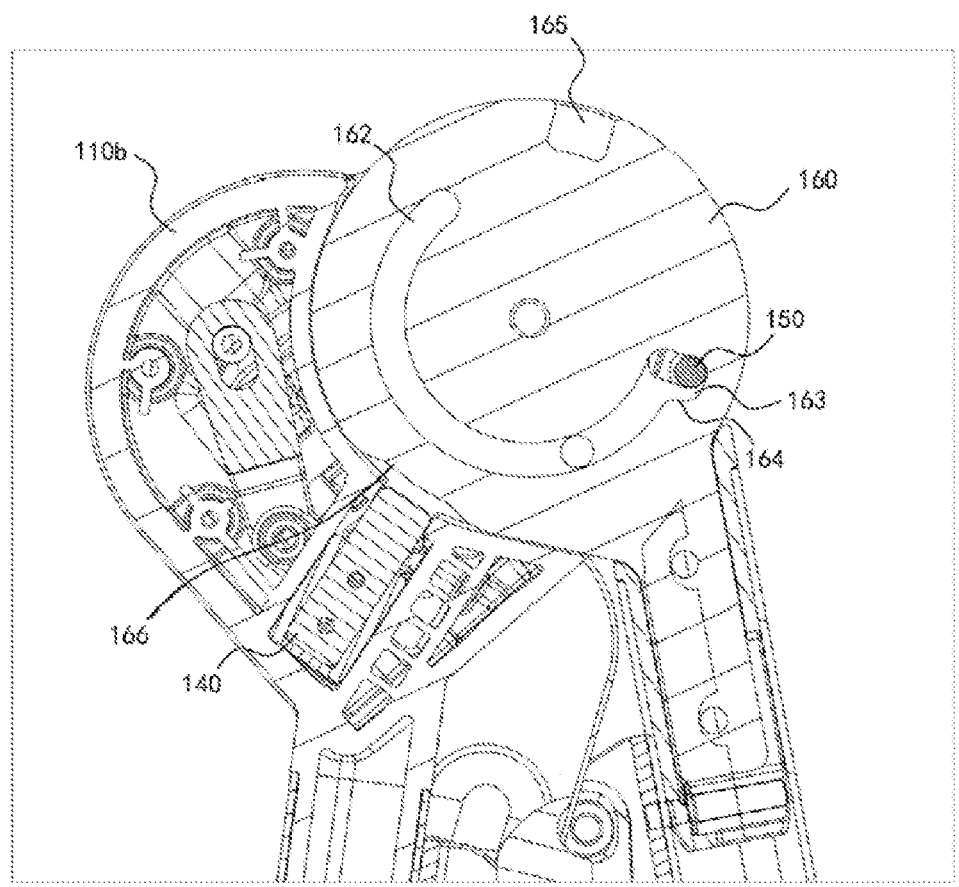
FIG. 6B is a partially enlarged view of FIG. 6A.

At first, refer to FIGS. 1A-2B. FIG. 1A is a perspective view of a carriage frame according to the application; and FIGS. 1B and 1C are partial enlarged views of FIG. 1A, showing specific structures of the folding hook structures 100 on left and right sides, respectively. As shown, in this embodiment, the baby carriage has two carriage frames symmetrically on left and right sides, and each carriage frame extends from a wheel below to a handrail above. The carriage frame has a long and straight tubular structure and may be divided into an upper carriage frame and a lower carriage frame. A folding hook structure 100 is disposed between the upper carriage frame and the lower carriage frame. The upper carriage frame is joined to the folding hook structure 100 by an upper joint 300, and the lower carriage frame is joined to the folding hook structure 100 by a lower joint 200. The upper joint 300 and the lower joint 200 can rotate in respect to each other through the folding hook structure 100, so as to allow the upper carriage frame and the lower carriage frame to be extended and collapsed (FIGS. 6A and 6B show the upper carriage frame and the lower carriage frame in a collapsible state).

The folding hook structure 100 according to the application, on the one hand, may serve as a pivot joint between the upper joint 300 and the lower joint 200, and on the other hand, may provide a locking function to lock and release the rotation between the upper joint 300 and the lower joint 200, which will be described in detail below.

Figure 2A:
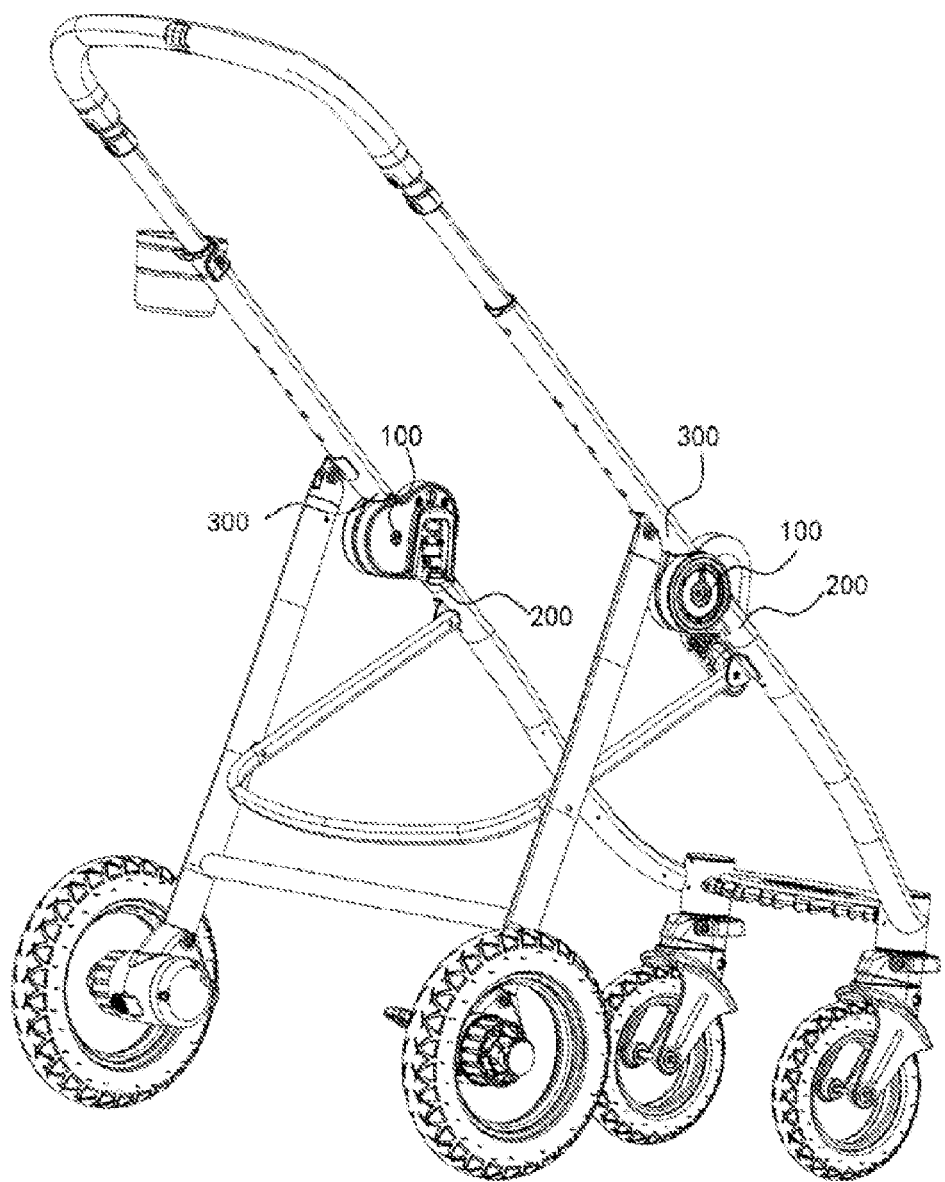
FIG. 2A is a perspective view of the carriage frame according to the application from another angle.
Figure 2B:
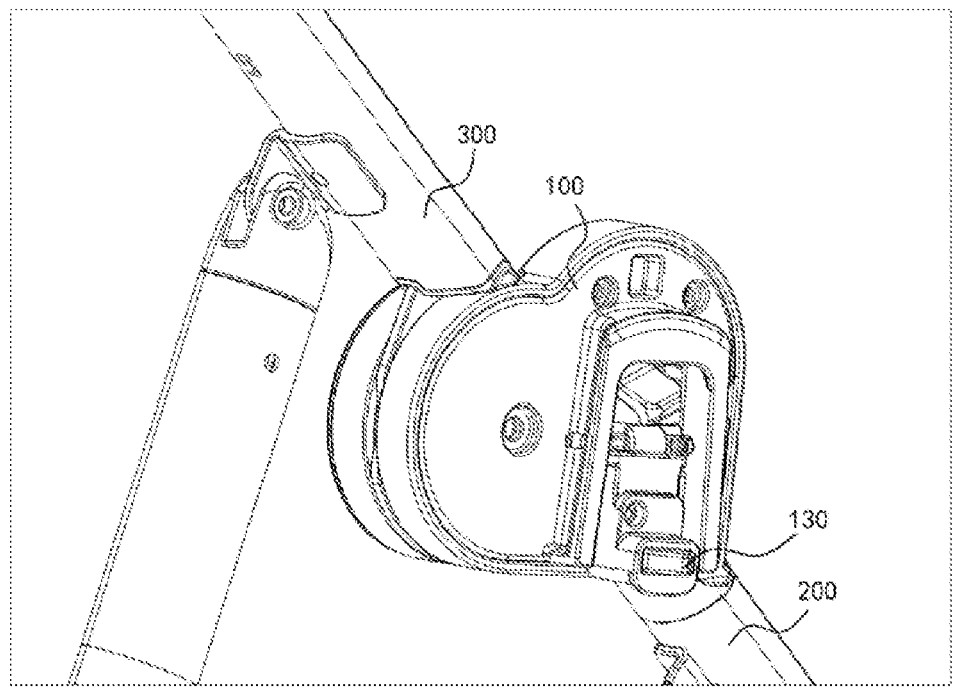
FIGS. 2B and 2C are partially enlarged views of FIG. 2A, showing specific structures of the folding hook structure on left and right sides, respectively.
Figure 2C:
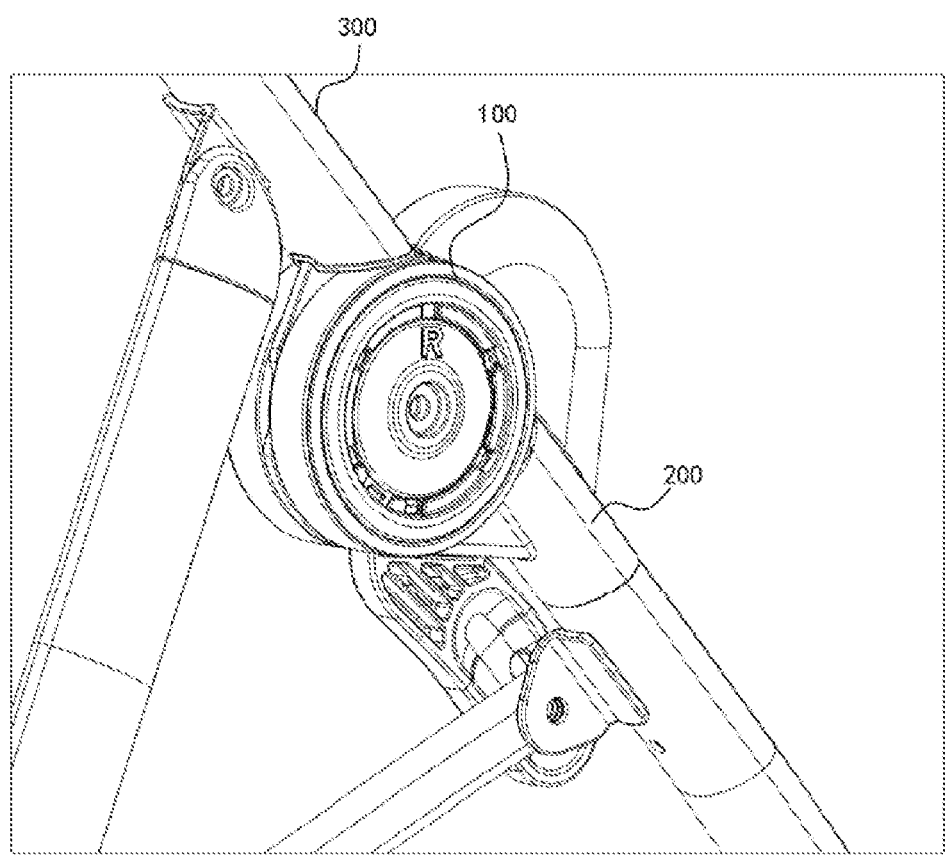

FIG. 2A is a perspective view of the carriage frame according to the application from another angle; and FIGS. 2B and 2C are partially enlarged views of FIG. 2A, showing specific structures of the folding hook structures 100 on left and right sides, respectively.

Although a baby carriage having carriage frames, joints, and folding hook structures 100 symmetrically on left and right sides are shown, it should be understood, the according to the baby carriage according to the application may have a carriage frame of other forms, such as an asymmetric frame. Moreover, the folding hook structure 100 according to the application can be used separately for a single carriage frame, or for any other type of device to provide the function of locking and releasing the relative rotation between the two components.

Figure 3A:
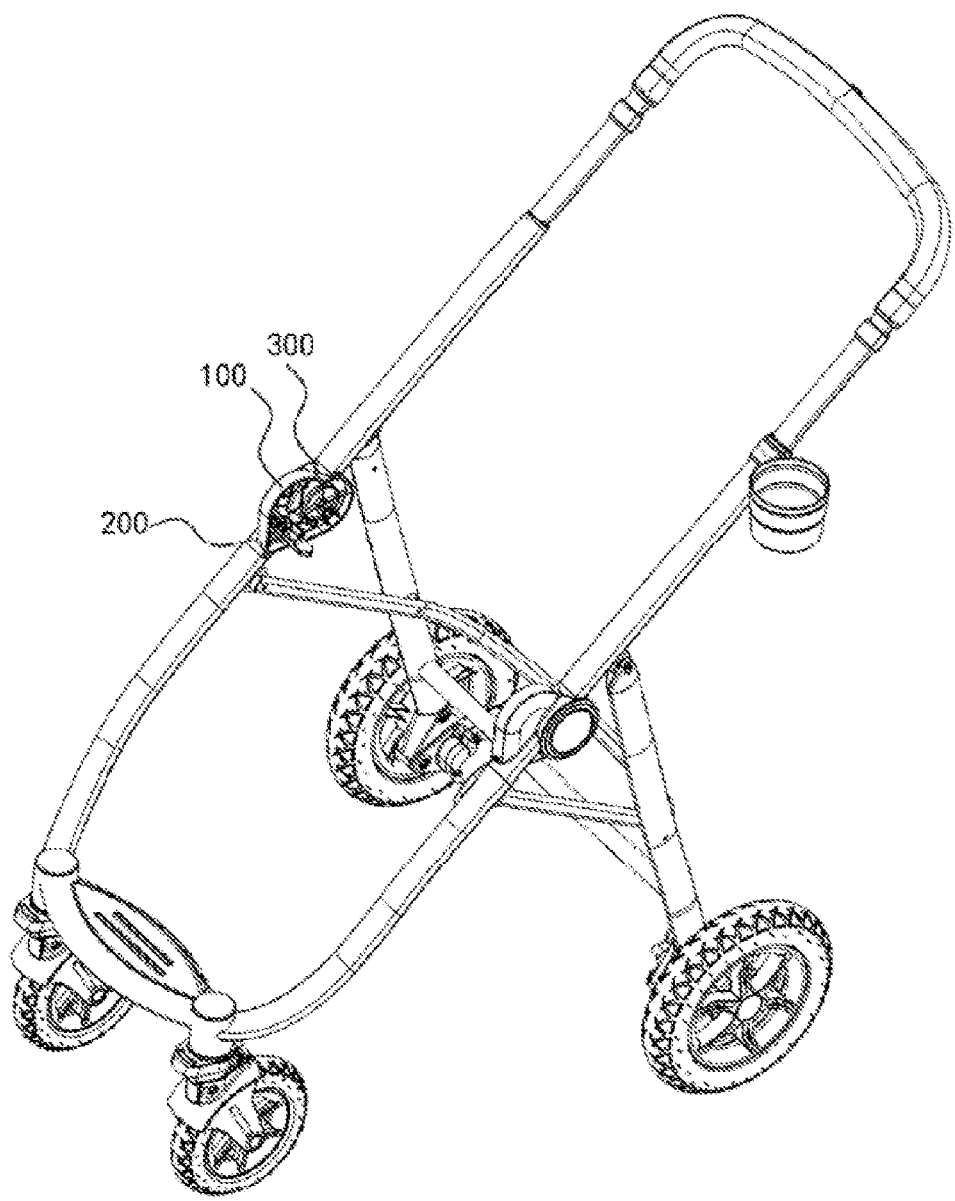
FIG. 3A is a perspective view of the carriage frame according to the application, in which an inner shell, a rotating disk, a sliding member, and a folding hook on left side of the folding hook structure are removed to show specific structures of an outer shell and a trigger member.
Figure 3B:
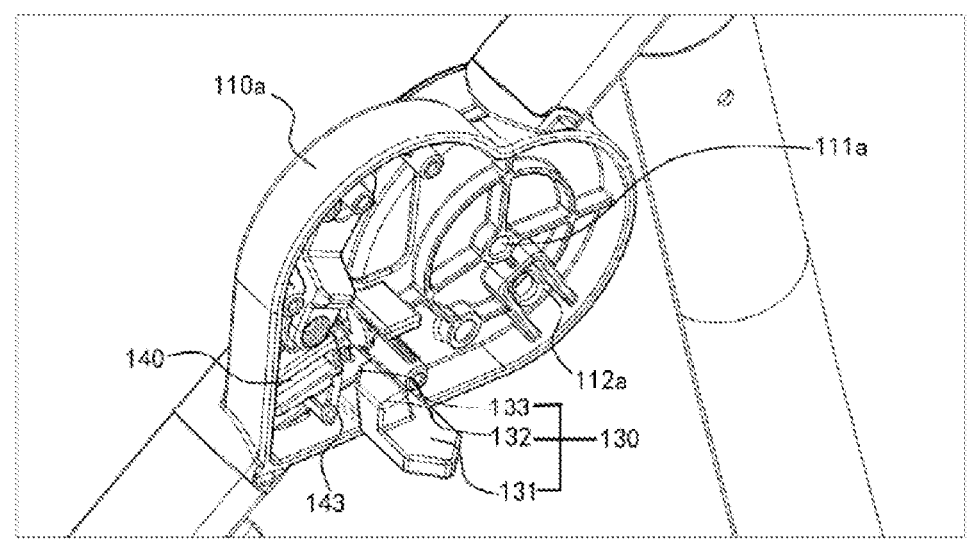
FIG. 3B is a partially enlarged view of FIG. 3A.

Now refer to FIGS. 3A-3B. FIG. 3A is a perspective view of the carriage frame according to the application, in which an inner shell 110*b*, a rotating disk 160, a sliding member 140, and a folding hook 150 on left side of the folding hook structure 100 are removed to show specific structures of an outer shell 110*a* and a trigger member 130; and FIG. 3B is a partially enlarged view of FIG. 3A.

As shown, a shell 110 in this embodiment is composed of an outer shell 110*a* and an inner shell 110*b*. The outer shell 110*a* is located on an outer side of the baby carriage, and has a bottom wall and a side wall surrounding the outer circumference of the bottom wall. The inner shell 110*b* is located on an inner side of the baby carriage, and is embedded in the side wall of the outer shell 110*a*. In this way, the outer shell 110*a* and the inner shell 110*b* together form the shell 110 having a closed structure. Other components of the folding hook structure 100 are at least partially accommodated in the shell 110, so as to form a clear appearance of the entire folding hook structure 100. The lower joint 200 is fixedly connected to the outer shell 110*a*, and the upper joint 300 is connected to a rotating disk 160 inside the shell 110 (will be described in detail below) bypassing through a slot on the side wall.

In other embodiments, positions of the inner shell 110*b* and the outer shell 110*a* may be exchanged. For example, the inner shell 110*b* may be located on the outer side of the baby carriage, and the outer shell 110*a* may be located on the inner side of the baby carriage. The lower joint 200 may also be connected to the inner shell 110*b*, and the upper joint 300 is connected to the rotating disk 160 inside shell 110.

In this embodiment, the bottom wall of the outer shell 110*a* is formed in a heart shape. Specifically, one side of the bottom wall of the outer shell 110*a* has a circular portion, so as to form a space for accommodating the rotating disk 160. The other side of the bottom wall opposite to the circular portion has a raised portion for accommodating components such as a trigger member 130, a sliding member 140 and the like. In other embodiments, the bottom wall can also be formed in other shapes as long as it can accommodate the above-mentioned components.

An outer rotation shaft hole 111*a* is formed in the circular portion of the bottom wall. A rotation shaft (not shown) passes through the outer rotation shaft hole 111*a*, the rotating disk 160, and an inner rotation shaft hole 111*b* formed in the inner shell 110*b*, such that the rotating disk 160 is rotatably disposed inside the shell 110. A folding hook accommodation space 112*a* is also formed in the circular portion of the bottom wall, so as to accommodate the folding hook 150. In an embodiment, the folding hook accommodation space 112*a* is formed as a sliding chute or a sliding rail extending along a radial direction of the rotating disk 160, such that the folding hook 150 is slidable along the radial direction.

FIG. 3B also clearly shows the sliding member 140 and the trigger member 130. The sliding member 140 is disposed in the raised portion of the bottom wall, and is arranged to be slidable along the radial direction of the rotating disk 160. That is, the sliding member 140 is on the outer side of the rotating disk 160, and can move along the radial direction of the rotating disk 160 between an extended position close to the rotating disk 160 and a retracted position away from the rotating disk 160. A function of the sliding member 140 is to be inserted into a notch 165 of the rotating disk 160, so as to lock a mutual rotation between the rotating disk 160 and the shell 110 (FIG. 5B). In this embodiment, the sliding member 140 includes a strip portion and a sliding member operating surface 143 (an inclined surface). Among them, the strip portion may slide along the radial direction of the rotating disk 160 and can be inserted into the notch 165 of the rotating disk 160; the sliding member operating surface 143 extends from a vicinity of the bottom wall of the outer shell 110*a* toward the inner shell 110*b*, and forms an inclination angle in respect to a direction perpendicular to the bottom wall (i.e., a direction parallel to the rotation axis of the rotating disk 160). The sliding member operating surface 143 is closer to the rotating disk 160 in the vicinity of the bottom wall of the outer shell 110*a*, and farther away from the rotating disk 160 in the vicinity of the inner shell 110*b*.

The trigger member 130 passes through the shell 110 in a direction parallel to the rotation axis of the rotating disk 160, and includes an operating section 131 exposed outside the shell 110 and a trigger section 132 abutting against the sliding member 140 inside the shell 110. The trigger member 130 may be operated to move in a direction perpendicular to the rotating disk 160, so as to bring the sliding member 140 to move from the extended position to the retracted position. Specifically, the trigger member 130 includes the operating section 131 and the trigger section 132. Among them, the operating section 131 extends through the inner shell 110*b* to the outer side of the shell 110, so as to facilitate the user to press the trigger member 130; the trigger section 132 is located inside the shell 110 and has a trigger member operating surface 133 opposite to the sliding member operating surface 143 of the sliding member 140. The trigger member operating surface 133 and the sliding member operating surface 143 have substantially a same inclination angle. In this way, when the user presses the trigger member 130, the trigger member 130 slides toward the inside of the shell 110 (specifically, toward the outer shell 110*a*). At this time, the trigger member operating surface 133 contacts and pushes the sliding member operating surface 143 of the sliding member 140, such that the sliding member 140 slides in a direction away the rotating disk 160.

Figure 4A:
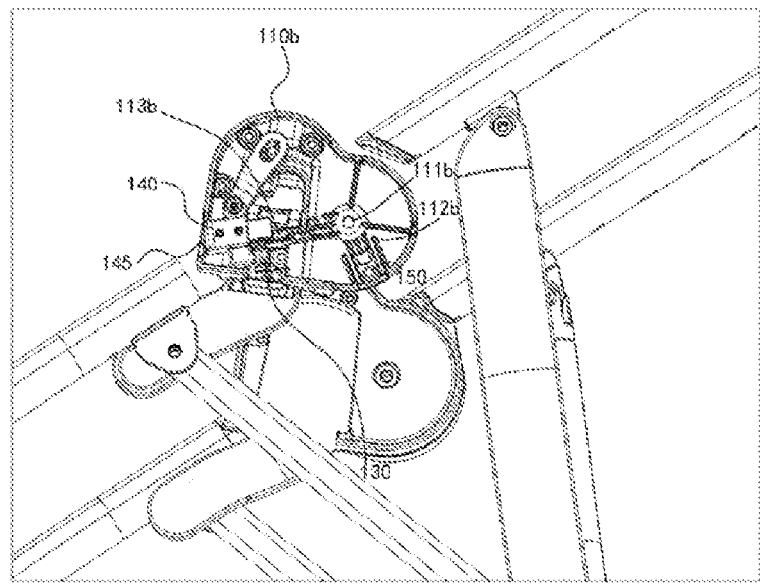
FIG. 4A is a partially enlarged perspective view of the carriage frame according to the application, in which the outer shell and a rotating disk of folding hook structure is removed to show the inner shell, the trigger member, the sliding member, and the folding hook.
Figure 4B:
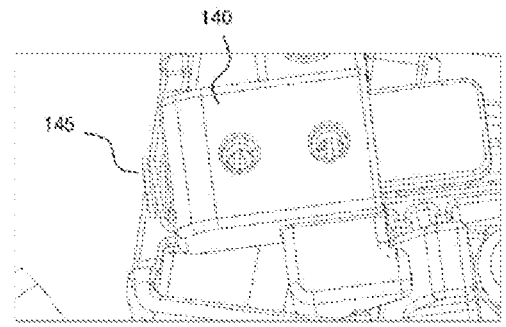
FIGS. 4B and 4C are further enlarged views showing the sliding member and the folding hook in FIG. 4A.
Figure 4C:
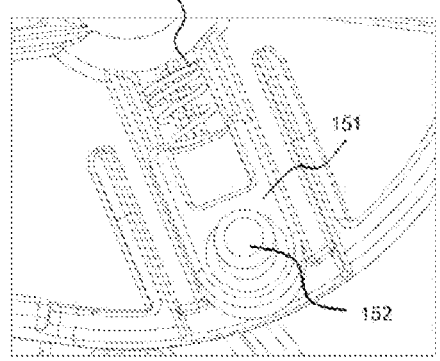

Now refer to FIGS. 4A-4C. FIG. 4A is a partially enlarged perspective view of the carriage frame according to the application, in which an outer shell 110*a* and a rotating disk 160 of the folding hook structure 100 on one side is removed to show the inner shell 110*b*, the trigger member 130, the sliding member 140, and the folding hook 150; FIGS. 4B and 4C are further enlarged views showing the sliding member 140 and the folding hook 150 in FIG. 4A. As shown, an inner rotation shaft hole 111*b*, a folding hook sliding rail 112*b*, and a sliding member sliding rail 113*b* are disposed in the inner shell 110*b*, and these structures may be respectively corresponding to the corresponding ones on the outer shell 110*a* to form a complete accommodating space.

It can be clearly seen from FIGS. 4A-4C, the folding hook 150 is disposed in the shell 110 in a manner of being slidable along the radial direction. More specifically, the folding hook 150 includes a slider portion 151 and a convex portion 152 on the slider portion 151. Among them, the slider portion 151 is received in the folding hook accommodation space 112*a* and can slide along the folding hook accommodation space 112*a*, and the convex portion 152 protrudes into a folding hook groove 161 of the rotating disk 160 (FIG. 5B). A folding hook elastic member 153 may be disposed between the folding hook 150 and the shell 110. The folding hook elastic member 153 has one end abutting against the shell 110, and the other end biasing the folding hook 150 to the locked position.

FIGS. 4A-4C also show the sliding member 140 from the other side. In an embodiment, a sliding member elastomer 145 may be disposed at an end of the sliding member 140 facing the side wall. The sliding member elastomer 145 has one end abutting against the side wall (the side wall is not shown in FIGS. 4A-4C), and the other end abutting against the sliding member 140 to bias the sliding member 140 to move toward the rotating disk 160. In this way, when the user does not press the trigger member 130, the sliding member 140 will tend to be inserted into the rotating disk 160, and when the user presses the trigger member 130, through the abutting relationship between the trigger member operating surface 133 and the sliding member operating surface 143, the trigger member 130 will resist biasing of the sliding member elastomer 145 and push the sliding member 140 to a direction away from the rotating disk 160.

FIGS. 4A-4C do not shown the upper joint 300 and the lower joint 200, so the entire folding hook structure 100 is shown as not connected to the upper carriage frame and the lower carriage frame. In use, the upper carriage frame and the lower carriage frame are respectively connected to the rotating disk 160 and the outer shell 110a through the upper joint 300 and the lower joint 200. In other embodiments, the upper carriage frame and the lower carriage frame may also be directly connected to the rotating disk 160 and the outer shell 110a. In other applications, the folding hook structure 100 may also be connected to different types of mutually rotating components, so as to provide a rotating pivot and be able to lock and release the mutual rotations between these components.

Figure 5A:
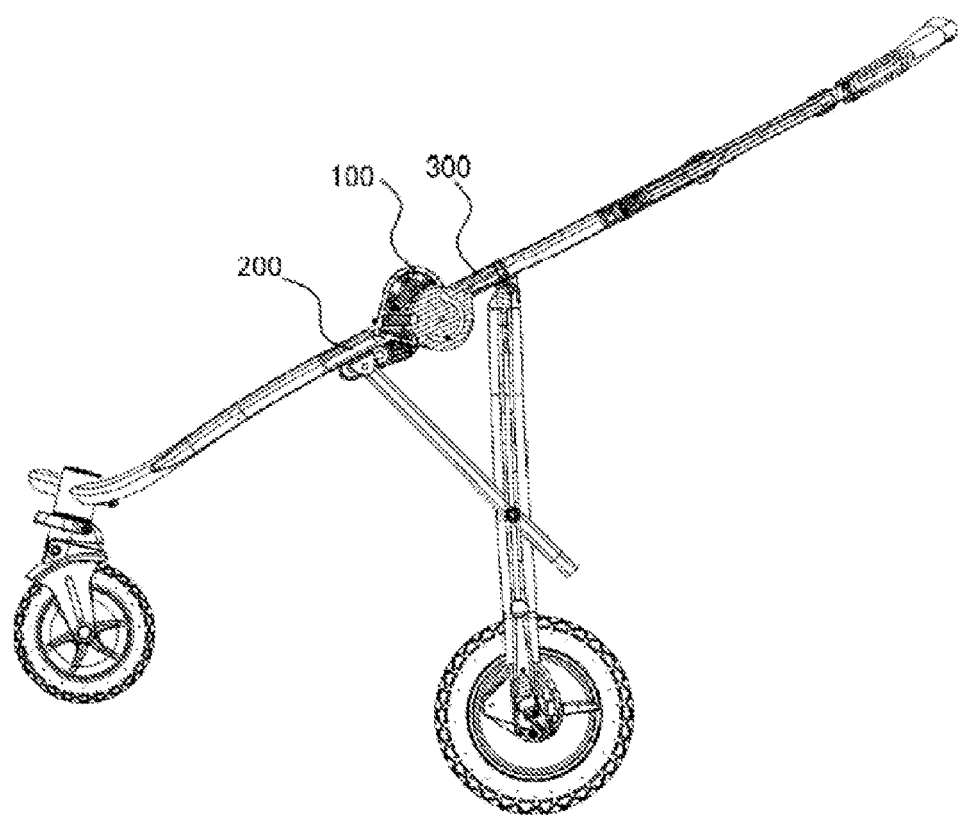
FIG. 5A is a side view of the carriage frame according to the application, in which internal details of the folding hook structure is shown in the form of a sectional view of the folding hook structure on one side, and the folding hook is in a released position.
Figure 5B:
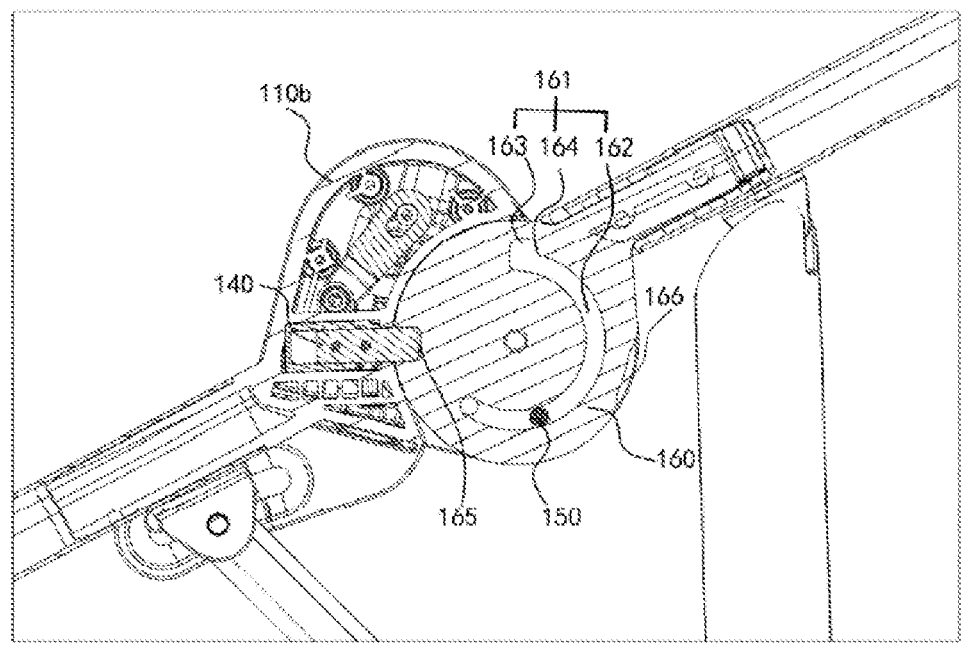
FIG. 5B is a partially enlarged view of FIG. 5A.

Now refer to FIGS. 5A-5B. FIG. 5A is a side view of the carriage frame according to the application, in which internal details of the folding hook structure 100 is shown in the form of a sectional view of the folding hook structure 100 on one side, and the folding hook 150 is in a released position; and FIG. 5B is a partially enlarged view of FIG. 5A. As shown, the rotating disk 160 is located in the shell 110 and can rotate around the rotation axis. A folding hook groove 161 is disposed on a disk surface of the rotating disk 160, the folding hook groove 161 includes a circumferential section 162 and a radial section 163, moreover, the circumferential section 162 extends in a circumferential direction of the rotating disk 160 with the rotation center as the center, and the radial section 163 extends in the radial direction of the rotating disk 160 from the circumferential section 162.

As shown in FIG. 5B, when the folding hook 150 is in its released position, the folding hook 150 is in the circumferential section 162 of the folding hook groove 161. In this way, the folding hook 150 would not obstruct the mutual rotation between the rotating disk 160 and shell 110. When the folding hook 150 is in its locked position (FIG. 6B), the folding hook 150 is in the radial section 163 of the folding hook groove 161. In this way, the folding hook 150 will prevent mutual rotation between the rotating disk 160 and the shell 110.

In an embodiment, the folding hook groove 161 may be a penetrating groove penetrating the rotating disk 160. In other embodiments, the folding hook groove 161 may not penetrate the rotating disk 160, rather, the folding hook groove 161 may be a concave groove depressed from the disk surface. In an embodiment, the radial section 163 of the folding hook groove 161 is located at an end of the circumferential section 162 and extends in a direction away from the rotation axis. In other embodiments, the radial section 163 may also be located in a middle of the circumferential section 162, and the radial section 163 may also extend in a direction close to the rotation axis.

In an embodiment, a side wall of the radial section 163 of the folding hook groove 161 facing the circumferential section 162 is inclined to form an oblique groove 164, such that the radial section 163 has a larger width where near the circumferential section 162 and a smaller width where away from the circumferential section 162. In this way, when the folding hook 150 is in the locked position (i.e., in the radial section 163 of the folding hook groove 161), as long as the user forcibly rotates the rotating disk 160 to an extending direction, the folding hook 150 may slide to its released position (i.e., in the circumferential section 162 of the folding hook groove 161) along the oblique groove 164.

It is also easy to understand from FIG. 5B, a notch 165 is formed on an outer circumference of the rotating disk 160. In the release position of the folding hook structure 100, the notch 165 can be aligned or not aligned with the sliding member 140 as the rotating disk 160 rotates. When the notch 165 is not aligned with the sliding member 140, the sliding member 140 abuts against the outer circumference of the rotating disk 160 and cannot move to the extended position. When the notch 165 is aligned with the sliding member 140, the sliding member 140 can move to the extended position and engage into the notch 165, thereby locking a rotation angle of the rotating disk 160 in respect to the shell 110.

In the shown embodiments, the circumferential section 162 of the folding hook groove 161 extends in an arc range of 160°-200°, and the notch 165 is located at a position opposite to the circumferential section 162 of the folding hook groove 161. In other embodiments, the circumferential section 162 of the folding hook groove 161 may have a different extension range, for example, a larger or smaller extension range, and the position of the notch 165 may be changed. In this way, the relative positional relationship between the upper joint 300 and the lower joint 200 in the collapsed state and the extended state can be changed.

Now refer to FIGS. 6A-6B. FIG. 6A is a side view of the carriage frame according to the application, in which internal details of the folding hook structure is shown in the form of a sectional view of the folding hook structure 100 on one side, and the folding hook 150 is in a locked position; and FIG. 6B is a partially enlarged view of FIG. 6A. As shown, a recess 166 is further disposed on the outer circumference of the rotating disk 160, and the recess 166 is approximately located at a position opposite to a middle position of the circumferential section 162 of the folding hook groove 161. In the locked position, the recess 166 is aligned with the sliding member 140 for the sliding member 140 to abut against thereon. In an embodiment, a depth of the recess 166 is designed such that when an external force acts to rotate the rotating disk 160 and the shell 110 in respect to each other, the sliding member 140 can slide out of the recess 166. For example, both sides of the recess 166 connected to the outer circumference of the rotating disk 160 may be designed as inclined edges, so as to facilitate the sliding member 140 to slide out of the recess 166. In this way, the sliding member 140 can help maintain the upper joint 300 and the lower joint 200 in the collapsed state. Moreover, when the user needs to expand the upper joint 300 and the lower joint 200, he/she can feel the carriage frame is separated by the resistance change brought by the sliding member 140.

In summary, the folding hook structure 100 according to the application actually provides two locking structures. According to the first locking structure, through the cooperation of the folding hook 150 with the folding hook groove 161 in the rotating disk 160, the folding hook structure 100 can be locked in a rotating position, e.g., a collapsed position where the upper joint 300 and the lower joint 200 are close to each other. According to the second locking structure, through the cooperation of the sliding member 140 with the notch 165 on the outer circumference of the rotating disk 160, the folding hook structure 100 can be locked in the other rotating position, e.g., an extended position where the upper joint 300 and the lower joint 200 are extended in respect to each other. Moreover, the folding hook structure 100 of the application also provides a convenient, safe and easily operational unlocking function for both of the above locked positions.

Although the present application has been described with reference to the exemplary embodiments, the terms used are illustrative and exemplary rather than restrictive. Since this application can be implemented in various forms without departing from the spirit and essence of the application, it should be understood, the above-mentioned embodiments are not limited to any of the foregoing details, but should be interpreted in the broadest sense within the scope defined by the claims. Therefore, all changes falling within the scope of the claims or their equivalents shall be covered by the claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A folding hook structure for arranging a first object and a second object being relatively rotatable in respect to each other to an extended state or a collapsed state, the folding hook structure comprising:
   a shell, fixed to the first object, and at least partially accommodates other parts of the folding hook structure;
   a rotating disk, fixed to the second object, and disposed in the shell to be rotatable around a rotation center in respect to the shell, with a folding hook groove disposed on a disk surface of the rotating disk, the folding hook groove including a circumferential section extending in a circumferential direction of the rotating disk with the rotation center as a center, and a radial section extending from the circumferential section along a radial direction of the rotating disk;
   a folding hook, disposed in the shell, and arranged movable between a locked position and a released position along the radial direction of the rotating disk, the folding hook being inserted in the folding hook groove;
   wherein in the locked position, the folding hook is engaged in the radial section of the folding hook groove to prevent a relative rotation between the shell and the rotating disk; and in the released position, the folding hook is slidable along the circumferential section of the folding hook groove to allow the relative rotation between the shell and the rotating disk;
   wherein when the folding hook is in the locked position, the first object and the second object are in the collapsed state; and when the folding hook is in the released position, the first object and the second object are in the extended state.

2. The folding hook structure according to claim 1, wherein:
   a folding hook accommodation space extending along the radial direction of the rotating disk is disposed in the shell, the folding hook includes a slider portion and a convex portion on the slider portion, the slider portion is received in the folding hook accommodation space and slidable along the folding hook accommodation space, and the convex portion protrudes into the folding hook groove of the rotating disk.

3. The folding hook structure according to claim 1, wherein:
   the radial section of the folding hook groove extends from an end of the circumferential section toward a direction away from the rotation center of the rotating disk, and a side wall of the radial section facing the circumferential section is inclined to form an oblique groove, such that the radial section has a larger width where near the circumferential section and a smaller width where away from the circumferential section.

4. The folding hook structure according to claim 1, wherein:
   a folding hook elastic member is disposed between the folding hook and the shell, the folding hook elastic member has one end abutting against the shell and the other end biasing the folding hook to the locked position.

5. The folding hook structure according to claim 1, further comprising:
   a sliding member, at least partially arranged in the shell, and movable between an extended position close to the rotating disk and a retracted position away from the rotating disk along the radial direction of the rotating disk;
   wherein a notch is formed on an outer circumference of the rotating disk, and in the released position, the notch is able to be aligned with the sliding member as the rotating disk rotates;
   when the notch is not aligned with the sliding member, the sliding member abuts against the outer circumference of the rotating disk and unable to move to the extended position; when the notch is aligned with the sliding member, the sliding member is able to move to the extended position and engage into the notch, thereby locking a rotation angle of the rotating disk in respect to the shell.

6. The folding hook structure according to claim 5, wherein a recess is further disposed on the outer circumference of the rotating disk, and the recess is approximately located at a position opposite to a middle position of the circumferential section of the folding hook groove, and
   wherein in the locked position, the recess is aligned with the sliding member for the sliding member to abut against thereon, and a depth of the recess is designed such that the first object and the second object are rotatable in respect to each other under an action of an external force.

7. The folding hook structure according to claim 5, further comprising:
   a trigger member, passing through the shell along an axial direction of the rotating disk and including an operating section exposed outside the shell and a trigger section abutting against the sliding member inside the shell, wherein the trigger member is operated movable in a direction perpendicular to the rotating disk, so as to bring the sliding member to move from the extended position to the retracted position.

8. The folding hook structure according to claim 7, wherein an end of the trigger section is provided with a trigger member operating surface, the sliding member is provided with a sliding member operating surface, and the trigger member operating surface and the sliding member operating surface are respectively correspondingly arranged inclined surfaces and capable of contacting each other, such that a movement of the trigger member in a direction perpendicular to the rotating disk is able to be converted into a movement of the sliding member along the radial direction of the rotating disk.

9. The folding hook structure according to claim 8, wherein:
   the inclined surface of the trigger member operating surface is arranged to extend from a vicinity of a bottom wall of an outer shell of the shell toward an inner shell of the shell, and is closer to the rotating disk at the bottom wall of the outer shell, so as to form an inclination angle in respect to a rotation axis of the rotating disk; and
   the inclined surface of the sliding member operating surface and the inclined surface of the trigger member operating surface have a same inclination angle.

10. The folding hook structure according to claim 5, wherein:
   a sliding member elastomer is disposed between the sliding member and the shell, and the sliding member elastomer is arranged to bias the sliding member to the extended position.

11. The folding hook structure according to claim 1, wherein:
   the shell includes an outer shell and an inner shell, one of the outer shell and the inner shell includes a bottom wall and a side wall erected along an outer circumference of the bottom wall, and the other one of the outer shell and the inner shell is embedded in the side wall, so as to form a closed structure with the one of the outer shell and the inner shell, and
   the one of the outer shell and the inner shell is fixed to the first object, and the second object passes through a slot on the side wall to be joined to the rotating disk.

12. The folding hook structure according to claim 1, wherein:
   the first object and the second object are both tubular parts.

13. A carriage frame comprising:
   an upper carriage frame, having an upper joint;
   a lower carriage frame having a lower joint; and
   the folding hook structure according to claim 1 connected between the upper joint and the lower joint, wherein the first object is the upper carriage frame, and the second object is the lower carriage frame.

14. A baby carriage comprising:
   a seat;
   wheels; and
   the carriage frame according to claim 13, wherein the seat is fixed on the carriage frame, and each of the wheels is installed at an end of the lower carriage frame of the carriage frame close to the ground.

* * * * *